United States Patent [19]

Rossell

[11] 3,911,291

[45] Oct. 7, 1975

[54] AC TO ABSOLUTE VALUE LINEAR CONVERTER

[75] Inventor: Allen J. Rossell, Detroit, Mich.

[73] Assignee: Burroughs Corporation, Detroit, Mich.

[22] Filed: July 23, 1973

[21] Appl. No.: 381,710

[52] U.S. Cl. .................. 307/229; 307/254; 328/144

[51] Int. Cl.[2] .......................................... H03K 17/00

[58] Field of Search ...... 328/26, 144; 307/229, 230, 307/236, 262; 324/119, 254, 123, 132

[56] References Cited

UNITED STATES PATENTS

| | | | |
|---|---|---|---|
| 2,822,474 | 2/1958 | Boecker | 328/26 |
| 3,508,075 | 4/1970 | Savage | 328/26 |
| 3,564,389 | 2/1971 | Richman | 328/26 |
| 3,714,570 | 1/1973 | Howell | 328/36 |

*Primary Examiner*—Michael J. Lynch
*Assistant Examiner*—B. P. Davis
*Attorney, Agent, or Firm*—Manuel Quiogue; Kenneth Watov; William B. Penn

[57] ABSTRACT

An AC to absolute value linear converter for converting an AC input signal into a rectified absolute value output signal. The AC input signal is rectified into positive and negative half-wave signals by a precision rectifier, the half-wave signals then being combined into a full wave rectified signal and driven into the load, the rectifier, combiner and driver being electrically isolated from each other. Differential amplifiers with appropriate feedback networks are resistively interconnected to provide all required functions and high-frequency capability, wherein DC and symmetry balancing networks are included to substantially eliminate DC offset in the output, and to provide a symmetrical output signal for low amplitude input signals, respectively.

15 Claims, 2 Drawing Figures

AC TO ABSOLUTE VALUE LINEAR CONVERTER

BACKGROUND OF THE INVENTION

This invention relates generally to AC to absolute value converters and specifically to linear full-wave rectification of high-frequency signals. The primary use of the invention is for converting AC read head signals of a magnetic ink character recognition system into an absolute value, such signals typically having a frequency of 23 kHz. The converter provides a very linear and, as a result, accurate, full-wave rectified output signal representation of the read head input signals. Being broadbanded, the converter is capable of linear conversion of DC to high-frequency input signals to provide an absolute value output.

Prior art devices have been hampered by various combinations of certain deficiencies, including nonlinearity, a DC offset in the output signal, an unsymmetrical output for low-level signals, and incapability of high-frequency detection. In attempting to solve such deficiencies, linear converters have employed single input and differential amplifiers to serve as precision rectifiers, wherein the rectifying diodes are included in resistive feedback circuits to minimize the effect of the output error caused by the forward voltage drop of the diodes.

Richman U.S. Pat. No. 3,480,794 discloses the use of parallel-connected precision rectifiers to obtain and improve high frequency response, wherein the precision rectifiers include operational amplifiers with the rectifying diodes in the feedback loops. Other prior art devices have incorporated operational amplifier precision rectifiers in combination with a plurality of operational amplifiers and various feedback schemes to provide a full-wave rectified output of an AC input signal.

Beaudette U.S. Pat. No. 3,546,596 discloses an absolute value amplifier circuit comprising a differential amplifier wired as a precision rectifier, wherein the AC signal is inputted across the differential inputs of the amplifier, and differential outputs of the amplifier are fed to feedback networks, each comprising a resistor and a diode in series, the diodes being like polarized, and wherein the differential outputs are ORed together to provide a positive-going absolute value output signal representation (full-wave rectification) of the AC input signal.

Ellermeyer U.S. Pat. No. 3,555,432 discloses a high-speed AC/DC converter, comprising an absolute value detector, the negative going half-wave rectified output of the detector being combined into a summing amplifier with the AC input signals, the positive going half-wave rectified signal output of the detector being summed into a second summing amplifier along with the AC signal input, the output of the second summing amplifier being summed into the first summing amplifier, wherein the output of the first summing amplifier is a positive going absolute value signal representative of the full-wave rectified AC input signal.

SUMMARY OF THE INVENTION

Accordingly, with these prior art problems in mind, it is an object of this invention to improve high-frequency AC to absolute value converters.

A further object is to provide an improved circuit in an AC to absolute value converter for combining half-wave rectified signals from a precision rectifier to obtain a full-wave rectified output signal.

Another object is to eliminate DC offset in the output signal, and to provide a symmetrical output for low-amplitude input signals.

These and other objects and advantages are accomplished by combining the positive and negative half-wave rectified output signals of a precision rectifier through two differential amplifiers into a full-wave rectified output signal. Other differential amplifiers are used to provide input and output isolation, and to permit the use of balancing networks for substantially eliminating DC offset and symmetry distortion in the output signal. A current source and emitter-follower are combined in the output circuit to provide power amplification.

BRIEF DESCRIPTION OF THE DRAWING

The foregoing objects and advantages of the invention, together with other advantages, which may be attained by its use, will be apparent from the following detailed description of the invention read in conjunction with the drawing in which.

DETAILED DESCRIPTION OF THE PREFERRED EMBODIMENT

Figures 1, 2:
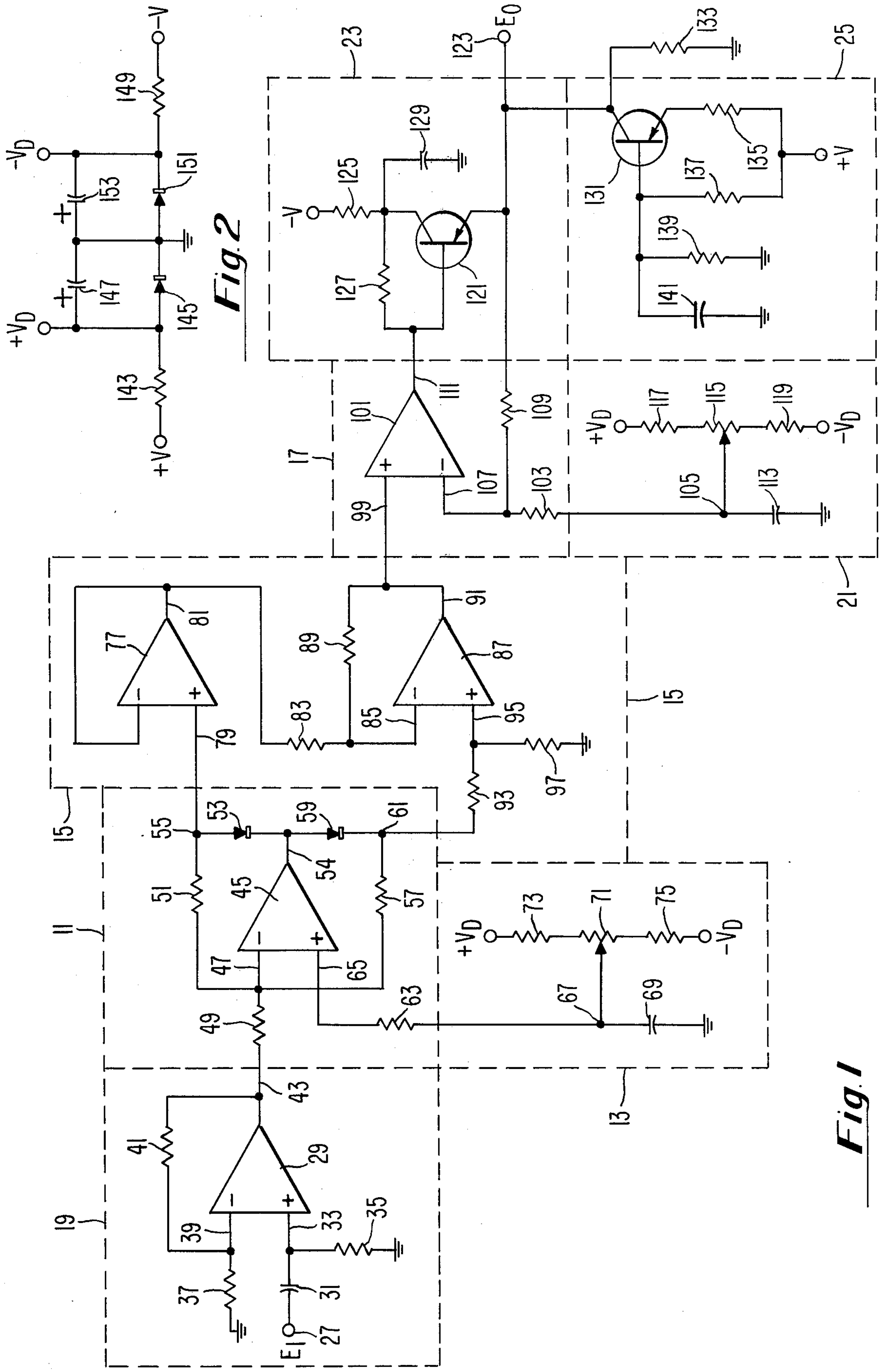
FIG. 1 is a schematic diagram of the improved AC to absolute value linear converter of the invention.
FIG. 2 is a schematic diagram of a reference voltage source for the AC balancing circuit and for the DC offset balancing circuit of FIG. 1.

The AC to absolute value linear converter of the invention, as shown in FIG. 1, includes a precision rectifier 11, an AC balancing network 13, a signal combining network 15, signal-followers 17, 19 with gain, a DC-offset balancing network 21, an emitter-follower 23, and a current source 25.

The signal-follower 19 with gain serves to electrically isolate the precision rectifier 11 from the input signal $E_1$ source. The signal follower 19 includes a differential amplifier 29 and an AC coupling capacitor 31 interconnected between a signal input terminal 27 and the non-inverting input 33 of the amplifier 29. The non-inverting input 33 and the inverting terminal 39 of amplifier 29 are grounded by resistor 35 and resistor 37, respectively. A feedback resistor 41 is connected between the output 43 of amplifier 29 and inverting input 39.

The precision rectifier 11 includes a differential amplifier 45 with its inverting input 47 connected to the output 43 of the input signal follower 19 through an input resistor 49. Rectification of the positive-going portion of an AC input signal is provided by a series feedback circuit including a resistor 51 connected between the inverting terminal 47 and the anode of diode 53, the cathode of the diode 53 being connected to the output 54 of amplifier 45. The junction 55 of resistor 51 and diode 53 provides a negative-going half-wave rectified output signal.

Rectification of the negative-going portion of an AC input signal is provided by another series feedback circuit including a resistor 57 connected between the inverting terminal 47 of amplifier 45 and the cathode of a diode 59, the anode of the diode 59 being connected to the amplifier output 54. The junction 61 of resistor 57 and diode 59 provides a positive-going half-wave rectified output signal.

An input resistor 63 is connected between the non-inverting input 65 of amplifier 45 and the output 67 of the AC balancing network 13. The AC balancing network 13 includes an AC bypass capacitor 69 connected between ground and the output 67, and a variable resistor 71 with its arm interconnected to the output 67. The variable resistor 71 is wired in series between two resistors 73, 75. The other ends of the resistors 73, 75 are respectively connected to reference voltages $+V_D$ and $-V_D$.

The signal combining network 15 includes a differential amplifier 77 wired as a signal-follower, with the amplifier's non-inverting input 79 connected to the negative-going half-wave rectified output 55 of the precision rectifier 11. A summing differential amplifier 87 has its inverting input 85 interconnected through an input resistor 83 to the output 81 of the signal-follower amplifier 77. A feedback resistor 89 is wired between the output 91 of the summing amplifier 87 and its inverting input 85. Another input resistor 93 connects the positive-going half-wave rectified output 61 of precision rectifier 11 to the non-inverting input 95 of summing amplifier 87, the input 95 also being connected to ground by resistor 97.

The summed or full-wave rectified output 91 of the summing amplifier 87 is connected to the non-inverting terminal 99 of the differential amplifier 101 of the signal-follower 17 with gain. An input resistor 103 is used to interconnect the output 105 of the DC offset balancing network 21 to the inverting input 107 of amplifier 101, the input 107 also being connected to a feedback resistor 109. The output 111 of the signal follower amplifier 101 is used to drive the emitter-follower 23.

The DC offset balancing network 21 includes an AC bypass capacitor 113 connected between the arm of a variable resistor 115 and ground. The variable resistor 115 is wired in series between two resistors 117, 119. Positive and negative reference voltages $V_D$ and $-V_D$ are respectively connected to the other ends of the resistors 117, 119. The arm of the variable resistor 115 is connected to the output 105 of the balancing network 21 to provide outputting of a selectable portion of either of the reference voltages $+V_D$ and $-V_D$.

The emitter-follower 23 includes a PNP transistor 121, with its emitter connected both through feedback resistor 109 to the inverting input 107 of signal-follower amplifier 101, and to the converter output terminal 123. A resistor 125 is connected between the collector of transistor 121 and a negative voltage supply. Another resistor 127 is connected between the base and collector of transistor 121, the base also being connected to the output 111 of the signal-follower amplifier 101. An AC bypass capacitor 129 connects the collector of PNP transistor 121 to ground.

The current source 25 includes another PNP transistor 131, having its collector connected to both converter output terminal 123 and to an output load resistor 133, the other end of the output load resistor 133 being connected to ground. A resistor 135 is connected between the emitter of transistor 131 and a positive voltage supply +V. Another resistor 137 is connected between the base of transistor 131 and the positive voltage supply. Also, connected between the base of transistor 131 and ground are a resistor 139 and an AC bypass capacitor 141.

A special voltage supply circuit, as shown in FIG. 2, may be used to provide the precision positive and negative $+V_D$, $-V_D$ reference voltages required by the AC balance and DC offset balance circuits. The special voltage supply circuit includes a resistor 143 connected between a positive supply voltage and the anode of a reference diode 145, the cathode being connected to ground. An AC bypass capacitor 147 is wired in parallel with diode 145. The positive reference voltage $+V_D$ is outputted from the junction of resistor 143 and diode 145.

Similarly, for obtaining $-V_D$, a resistor 149 is interconnected from a negative supply voltage to the cathode of a reference diode 151, the anode of the diode 151 being grounded. An AC bypass capacitor 153 is wired in parallel with the diode 151. The negative reference voltage $-V_D$ is outputted from the junction of the diode 151 and resistor 149. The values of resistors 143 and 149 are chosen to insure that their respective diodes 145, 151 operate within their linear regions of operation.

Prior to actual operation, the converter of the invention should be balanced. First, the signal input terminal 27 is grounded; then the variable resistor 115 of the DC-offset balance network 21 is adjusted to provide sufficient positive or negative voltage at the inverting input 107 of the amplifier 101 of the output signal-follower 17 to cause the emitter follower 23 output to draw sufficient negative current through the load resistor 133 to balance the positive current being driven into the load resistor 133 from the current source 25, and to balance any current developed in the load resistor 133 from the cumulative DC-offset voltage of the interconnected differential amplifiers. Output signal symmetry is aligned by providing a millivolt level input signal, monitoring the output signal, and adjusting the variable resistor 71 in the AC-balance network 13 for best symmetry.

In operation, input signals from DC (bypassing the AC coupling capacitor 31 for a DC input) to 100 kHz are capable of being very accurately detected by the converter. The inputted signal is amplified by signal-follower 19 and fed to precision rectifier 11.

The input signal-follower 19 gain factor is determined by the relative values of feedback resistor 41 (R1) and input resistor 37 (R2), the gain factor magnitude being equal to the quantity $[1 + (R1/R2)]$.

The precision rectifier 11 provides both gain and rectification of its input signal. Gain for a positive-going input signal is determined by the relative values of feedback resistor 51 (R3) and the input resistor 49 (R4), and is equal to the quantity $(-R3/R4)$. Similarly, the gain for a negative-going input signal is determined by the relative values of feedback resistor 57 (R5) and input resistor 49 (R4), and equal to the quantity $(-R5/R4)$.

The positive- and negative-going half-wave rectified signals are outputted from precision rectifier 11 to the signal combiner 15. Signal combining, gain, and inversion of the negative-going half-wave rectified signal are provided by the signal combiner 15.

Within the signal combiner 15, the negative-going half-wave rectified signal is inputted to the signal follower amplifier 77. The output of the signal follower amplifier 77 is fed by the input resistor 83 to the inverting input 85 of differential amplifier 87. The signal-follower amplifier 77 serves to electrically isolate the differential amplifier 87 feedback signal (inputted to its inverting input 85 by a feedback resistor 89), from the negative-going output 55 of the precision rectifier 11. The positive-going half-wave rectified output signal of the precision rectifier 11 is inputted through input resistor 93 to the non-inverting input 95 of the differential amplifier 87.

The differential summing amplifier 87 inverts, with gain, the negative-going half-wave rectified signal. Gain magnitude is determined by the relative values of the feedback resistor 89 (R6) and input resistor 83 (R7) of inverting input 85, and equal to the quantity (—R6/R7). Gain is also provided for the positive-going half-wave rectified signal inputted to amplifier 87, by the relative values of R6, R7, the input resistor 93 (R8), and the grounding resistor 97 (R9) of the non-inverting terminal 95; the gain magnitude being equal to the quantity [R9/(R8 + R9)] [1 + (R6/R7)].

The full-wave rectified output of the summing amplifier 87 is inputted to the signal-follower 17 with gain. Gain of the signal-follower is determined by the relative values of feedback resistor 109 (R10) and input resistor 103 (R11), and is equal to the quantity [1 + (R10/R11)].

The signal-follower 17 output drives the emitter-follower 23. As the output signal from signal-follower 17 goes more positive, it in turn causes transistor 121 of emitter-follower 23 to go towards cutoff, causing the transistor 121 to draw less negative current through the load resistor 133 from ground, thus permitting proportionally more positive current from the current source 25 to flow through the load resistor 133, resulting in a proportionally more positive converter output signal. It is in this manner, that the emitter-follower 23 and the current source 25 provide power amplification at the output of the absolute value converter.

At zero volts input to the output signal-follower 17 or converter, the negative current through the output load resistor 133 drawn by the omitter-follower 23, is equally balanced by the positive current delivered by the current source 25, resulting in zero volt converter output signal at the output terminal 123.

The overall gain of the converter is equal to the product of the individual gains. For a positive-going input signal, the overall gain is as follows:

$$[1+(R1/R2)][-R3/R4][-R6/R7][1+(R10/R11)].$$

Overall gain for a negative-going detector input signal is as follows:

$$[1+(R1/R2)]\ [-R5/R4]\ [(R9/(R8+R9)]\ [1+(R6/R7)][1+(R10/R11)].$$

In accordance, the output signal $E_O$ is equal to the absolute value of the input signal with gain as follows:

$$E_O=+E_1\ [\text{POSITIVE-GOING INPUT GAIN}]+(-E_1)\ [\text{NEGATIVE-GOING INPUT GAIN}].$$

To insure that the gains are equal for both positive and negative values of signal input $E_1$, the following relations must be observed:

$R3 = R5$ $(R7/R6) = (R8/R9)$

The above relations are derived as follows:

Let [POSITIVE-GOING INPUT GAIN] = [NEGATIVE-GOING INPUT GAIN]

Then $$[R3/R4]\ [R6/R7] = [R5/R4]\ [R9/(R8+R9)]\ [1+(R6/R7)]$$

Let $R3 = R5$

Then $$R6/R7 = [R9/(R8+R9)]\ [1+(R6/R7)]$$

$$[R6/R7]\ [1/(1+R6/R7)] = R9/(R8+R9)$$

$$R6/R7+R6) = R9/(R8+R9)$$

$$1/[1+(R7/R6)] = 1/[1+(R8/R9)]$$

Therefore, if the equality is to hold true, $$R7/R6 \text{ must} = R8/R9$$

What is claimed is:

1. A circuit for linearly converting AC input signals to absolute value output signals comprising:

means for precisely rectifying the AC input signal into positive and negative half-wave wavetrains;

differential amplifier means for combining said positive and negative half-wave wavetrains into a full-wave rectified wavetrain; and impedance means for unidirectionally isolating said rectifying means from said differential amplifier means.

2. The converting circuit of claim 1, wherein said rectifying means include a first differential amplifier and first and second feedback circuits connected between the output and inverting input of said first differential amplifier for positive and negative half-wave rectification, respectively, of said AC input signals, each of said feedback circuits including a resistor and a diode in series, said diodes being connected by an anode and cathode, respectively, to said differential amplifier output.

3. The converting circuit of claim 2 also including a first adjustable balancing circuit driving a non-inverting input of said first differential amplifier for adjusting the symmetry of said absolute value signal.

4. The converting circuit of claim 3 wherein said first adjustable balancing circuit includes:

a first variable resistor resistively connected between positive and negative precision DC voltage sources, the arm of said variable resistor being capacitively connected to ground and resistively connected to the non-inverting input of said first differential amplifier.

5. The converting circuit of claim 2, wherein said differential amplifier means include a second differential amplifier and wherein said impedance means interconnects said second feedback circuit to the inverting input of said second differential amplifier for transmitting negative-going half-wave rectified signals thereto, and wherein said first feedback circuit is resistively connected to the non-inverting input of said second differential amplifier for transmitting positive-going half-wave rectified signals thereto.

6. The converting circuit of claim 5, wherein said impedance means includes:

a third differential amplifier wired as a signal follower having its non-inverting input connected to the junction of said resistor and diode of said second feedback circuit and its output connected to the inverting input of said second differential amplifier.

7. The converting circuit of claim 6 also including a power amplification circuit for driving the full wave rectified wavetrain from the output of said second differential amplifier into the output of said converting circuit.

8. The converting circuit of claim 7, wherein said power amplification circuit comprises:

a fourth differential amplifier wired as a signal-follower with gain having its non-inverting input connected to the output of said second differential amplifier;

an emitter-follower driven by said fourth differential amplifier;

an output load resistor interconnected between said emitter-follower output and ground; and a current source interconnected to the junction of said load-resistor and emitter-follower, wherein said emitter-follower controls the flow of current from the current source to the load resistor and converting circuit output, as a function of the amplitude of the output of said fourth differential amplifier.

9. The converting circuit of claim 8, wherein said power amplification circuit further includes:

a second balancing circuit driving an inverting input of said fourth differential amplifier for compensating and substantially eliminating any DC offset in said third amplifier output signal.

10. The converting circuit of claim 9, wherein said second balancing circuit includes:

a second variable resistor resistively connected between positive and negative precision DC voltage sources, the arm of said variable resistor being capacitively connected to ground and resistively connected to the inverting input of said fourth differential amplifier.

11. The converting circuit of claim 8, wherein said emitter-follower includes:

a PNP transistor; having its collector resistively connected to its base and capacitively connected to ground, for stabilizing said fourth amplifier and for preventing ringing in the output signal, said collector also being resistively connected to a negative voltage supply for limiting power to said transistor; and also having its base connected to said fourth amplifier output, and emitter resistively connected to said fourth differential amplifier inverting input.

12. A power amplification circuit comprising:

a differential amplifier wired as a signal-follower with gain for receiving an input signal;

an emitter-follower driven by said differential amplifier;

an output load resistor interconnected between said emitter-follower output and ground; and a current source interconnected to the junction of said load resistor and emitter-follower, wherein said emitter-follower controls the flow of current from the current source to the load resistor and to an output of the circuit, as a function of the amplitude of said input signal.

13. The power amplification circuit of claim 12, wherein said emitter-follower further includes:

a PNP transistor;

said transistor's collector being resistively connected to its base and capacitively connected to ground to stabilize said amplifier and to prevent ringing in the output signal, said collector also being resistively connected to a negative voltage supply for limiting power to said transistor;

said transistor's base being connected to an output of said amplifier, and emitter being resistively connected to an inverting input of said differential amplifier.

14. The power amplification circuit of claim 13, which further includes:

a balancing circuit driving an inverting input of said differential amplifier, for compensating and substantially eliminating any DC-offset in said amplifier output signal.

15. The power amplification circuit of claim 14, wherein said balancing circuit includes:

a variable resistor resistively connected between positive and negative precision DC voltage sources, the arm of said variable resistor being capacitively connected to ground and resistively connected to the inverting input of said differential amplifier.

* * * * *